United States Patent
Baijal et al.

(10) Patent No.: US 11,699,289 B2
(45) Date of Patent: Jul. 11, 2023

(54) DISPLAY DEVICE FOR GENERATING MULTIMEDIA CONTENT, AND OPERATION METHOD OF THE DISPLAY DEVICE

(71) Applicant: SAMSUNG ELECTRONICS CO., LTD., Suwon-si (KR)

(72) Inventors: Anant Baijal, Suwon-si (KR); Shobhit Jain, Suwon-si (KR); Sangshin Park, Suwon-si (KR); Eunae Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 10 days.

(21) Appl. No.: 17/336,965

(22) Filed: Jun. 2, 2021

(65) Prior Publication Data
US 2021/0390314 A1    Dec. 16, 2021

(30) Foreign Application Priority Data
Jun. 10, 2020   (KR) ........................ 10-2020-0070358

(51) Int. Cl.
*G06F 17/00*     (2019.01)
*G06V 20/40*     (2022.01)
(Continued)

(52) U.S. Cl.
CPC .............. *G06V 20/46* (2022.01); *G06F 3/165* (2013.01); *G06N 3/045* (2023.01); *G06N 3/08* (2013.01); *G10L 25/57* (2013.01); *G06V 2201/02* (2022.01)

(58) Field of Classification Search
CPC ............ G06V 20/146; G06V 2201/02; G06V 10/764; G06V 20/41; G06F 3/165;
(Continued)

(56) References Cited

U.S. PATENT DOCUMENTS 7,890,534 B2 *    2/2011   Bathiche ............... G06F 40/151
                                                              715/255
9,330,719 B2      5/2016   Axen et al.
(Continued)

FOREIGN PATENT DOCUMENTS

KR    10-2019-0031033 A    3/2019
KR    10-2020-0044435 A    4/2020

OTHER PUBLICATIONS

Vassiliou, A., et al, "Formalising Stories: Sequences of Events and State Changes", 2004 IEEE International Conference on Multimedia and Expo (ICME), vol. 1, pp. 587-590, DOI: 10.1109/ICME.2004.1394260, Jan. 1, 2004 (Year: 2004).*
(Continued)

*Primary Examiner* — Laurie A Ries
(74) *Attorney, Agent, or Firm* — Sughrue Mion, PLLC

(57) ABSTRACT

A display apparatus for generating multimedia content and an operation method thereof are provided. The display apparatus includes a display, a memory storing one or more instructions, and a processor configured to execute the one or more instructions stored in the memory. The processor is configured to obtain plot information of the multimedia content, and generate sequence information including one or more sequences of the multimedia content corresponding to the plot information by using a first artificial intelligence (AI) model, generate scene information based on the sequence information by using a second AI model, generate the multimedia content based on the scene information, and control the display to output the multimedia content.

19 Claims, 15 Drawing Sheets

(51) Int. Cl.
*G06F 3/16* (2006.01)
*G10L 25/57* (2013.01)
*G06N 3/08* (2023.01)
*G06N 3/045* (2023.01)

(58) Field of Classification Search
CPC ........ G06F 3/167; G06N 3/0454; G06N 3/08; G06N 3/0472; G10L 25/57; G09G 2360/16; G09G 5/003; G09G 3/2092; G06Q 50/10; H04N 21/854
See application file for complete search history.

(56) References Cited

U.S. PATENT DOCUMENTS

| | | | | |
|---|---|---|---|---|
| 10,999,566 | B1* | 5/2021 | Mahyar | G10L 13/00 |
| 11,170,256 | B2* | 11/2021 | Min | G06N 3/047 |
| 2016/0352887 | A1* | 12/2016 | Na | H04M 1/72436 |
| 2017/0105662 | A1* | 4/2017 | Silawan | A61B 5/165 |
| 2019/0035431 | A1* | 1/2019 | Attorre | G11B 27/34 |
| 2019/0107927 | A1 | 4/2019 | Schriber et al. | |
| 2019/0213254 | A1* | 7/2019 | Ray | G06N 3/0445 |
| 2019/0258907 | A1 | 8/2019 | Rozende et al. | |
| 2019/0304156 | A1* | 10/2019 | Amer | G06N 3/0454 |
| 2020/0035215 | A1 | 1/2020 | Yang et al. | |
| 2020/0097502 | A1* | 3/2020 | Trim | G06F 16/7834 |
| 2020/0210710 | A1 | 7/2020 | Lee et al. | |
| 2021/0019531 | A1* | 1/2021 | Long | G06V 20/46 |
| 2021/0127165 | A1* | 4/2021 | Dang | H04N 21/4532 |
| 2021/0136459 | A1* | 5/2021 | Mathur | G06V 10/774 |
| 2021/0390314 | A1* | 12/2021 | Baijal | G06V 10/764 |

OTHER PUBLICATIONS

Communication dated Aug. 25, 2021, issued by the International Searching Authority in counterpart International Application No. PCT/KR2021/005983 (PCT/ISA/220, 210, 237).

* cited by examiner

DISPLAY DEVICE FOR GENERATING MULTIMEDIA CONTENT, AND OPERATION METHOD OF THE DISPLAY DEVICE

CROSS-REFERENCE TO RELATED APPLICATION

This application is based on and claims priority under 35 U.S.C. § 119 to Korean Patent Application No. 10-2020-0070358, filed on Jun. 10, 2020, in the Korean Intellectual Property Office, the disclosure of which is incorporated by reference herein in its entirety.

BACKGROUND

1. Field

The disclosure relates to display apparatuses and operation methods thereof, and more particularly, to a display apparatus capable of generating multimedia content by using an artificial intelligence (AI) model and outputting the generated multimedia content, and an operation method of the display apparatus.

2. Description of the Related Art

Artificial intelligence (AI) systems are computer systems configured to realize human-level intelligence by training machines to make determinations spontaneously to become smarter, and derive or aim a desired result, in contrast to existing rule-based smart systems. Because recognition rates of AI systems improve and the AI systems more accurately understand a user's preferences the more they are used, existing rule-based smart systems are being gradually replaced by deep-learning AI systems.

AI technology includes machine learning (deep learning) and element technologies implementing the machine learning. Machine learning is an algorithm technology that self-classifies/learns the characteristics of input data, and uses a machine learning algorithm, such as deep learning. The machine learning may be used in technical fields, such as linguistic understanding, visual understanding, deduction/prediction, knowledge representation, operation control, and etc.

Elemental technologies for implementing AI technology may include at least one of linguistic understanding technology that recognizes human language/text, visual understanding technology that recognizes objects like human eyes, deduction/prediction technology that logically deduces and predicts information by judging information, knowledge expression technology that processes human experience information as knowledge data, and motion control technology that controls an autonomous driving of a vehicle and a movement of a robot.

SUMMARY

Provided are a display apparatus capable of generating scene information of multimedia content by using an artificial intelligence (AI) model, generating multimedia content, based on the generated scene information, and outputting the generated multimedia content, and an operation method of the display apparatus.

Additional aspects will be set forth in part in the description which follows and, in part, will be apparent from the description, or may be learned by practice of the one or more embodiments of the disclosure.

According to an embodiment, there is provided a display apparatus for generating multimedia content. The display apparatus includes: a display; a memory storing one or more instructions; and a processor configured to execute the one or more instructions stored in the memory. The processor is configured to: obtain plot information of the multimedia content; generate sequence information including one or more sequences of the multimedia content corresponding to the plot information by using a first artificial intelligence (AI) model; generate scene information based on the sequence information by using a second AI model; generate the multimedia content based on the scene information; and control the display to output the multimedia content.

The processor is further configured to obtain genre information and emotion information of the multimedia content, and generate the plot information of the multimedia content based on the genre information and the emotion information of the multimedia content by using a third AI model.

The emotion information of the multimedia content includes valence information represented with respect to a reproduction time of the multimedia content and arousal information represented with respect to the reproduction time of the multimedia content.

The processor is further configured to randomly obtain story information of the multimedia content from a story database (DB), and the third AI model is trained to output the plot information based on the story information, the genre information and the emotion information.

The first AI model is trained to output the sequence information based on the plot information.

The second AI model is trained to output the scene information based on receiving character information of the multimedia content and the sequence information of the multimedia content.

The scene information includes at least one of background information of a scene, information about a behavior of a character appearing in the scene, and conversation contents of the character.

The processor is further configured to: select a character from a character database (DB), based on the character information of the multimedia content; and generate the multimedia content based on the selected character and the scene information.

The display apparatus further includes an audio output interface, wherein the processor is further configured to: obtain emotion information about the scene, based on the scene information, and generate a background audio of the scene, based on genre information of the multimedia content and the emotion information; and control the audio output interface to output the background audio.

The processor is further configured to generate the background audio corresponding to the emotion information and the genre information of the multimedia content by using a fourth AI model, and wherein the fourth AI model is trained to output the background audio based on the emotion information and the genre information of the multimedia content.

According to an embodiment, there is provided an operation method of a display apparatus for generating multimedia content. The operation method includes: obtaining plot information of the multimedia content; generating sequence information including one or more sequences of the multimedia content corresponding to the plot information by using a first artificial intelligence (AI) model; generating scene information based on the sequence information by using a second AI model; generating the multimedia content based on the scene information; and outputting the multimedia content.

The obtaining of the plot information of the multimedia content includes: obtaining genre information and emotion information of the multimedia content; and generating the plot information of the multimedia content based on the genre information and the emotion information of the multimedia content by using a third AI model.

The emotion information of the multimedia content includes valence information represented with respect to a reproduction time of the multimedia content and arousal information represented with respect to the reproduction time of the multimedia content.

The obtaining of the plot information of the multimedia content further includes randomly obtaining story information of the multimedia content from a story database (DB), and the third AI model is trained to output the plot information based on the story information, the genre information, and the emotion information.

The first AI model is trained to output the sequence information based on the plot information.

The second AI model is trained to output the scene information based on receiving character information of the multimedia content and the sequence information of the multimedia content.

The scene information includes at least one of background information of a scene, information about a behavior of a character appearing in the scene, and conversation contents of the character.

The generating of the multimedia content includes: selecting a character from a character database (DB), based on the character information of the multimedia content; and generating the multimedia content based on the selected character and the scene information.

The operation method further includes: obtaining emotion information of the scene, based on the scene information; generating a background audio of the scene based on the emotion information and the genre information of the multimedia content; and outputting the background audio.

The generating of the background audio includes generating the background audio corresponding to the emotion information and the genre information of the multimedia content by using a fourth AI model, and the fourth AI model is trained to generate the background audio based on the emotion information and the genre information of the multimedia content.

According to an embodiment, there is provided a non-transitory computer readable recording medium storing one or more instructions, when executed by a processor, the processor is configured to: obtain plot information of the multimedia content; generate sequence information including one or more sequences of the multimedia content corresponding to the plot information by using a first artificial intelligence (AI) model; generate scene information based on the sequence information by using a second AI model; generate the multimedia content based on the scene information; and control the display to output the multimedia content.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
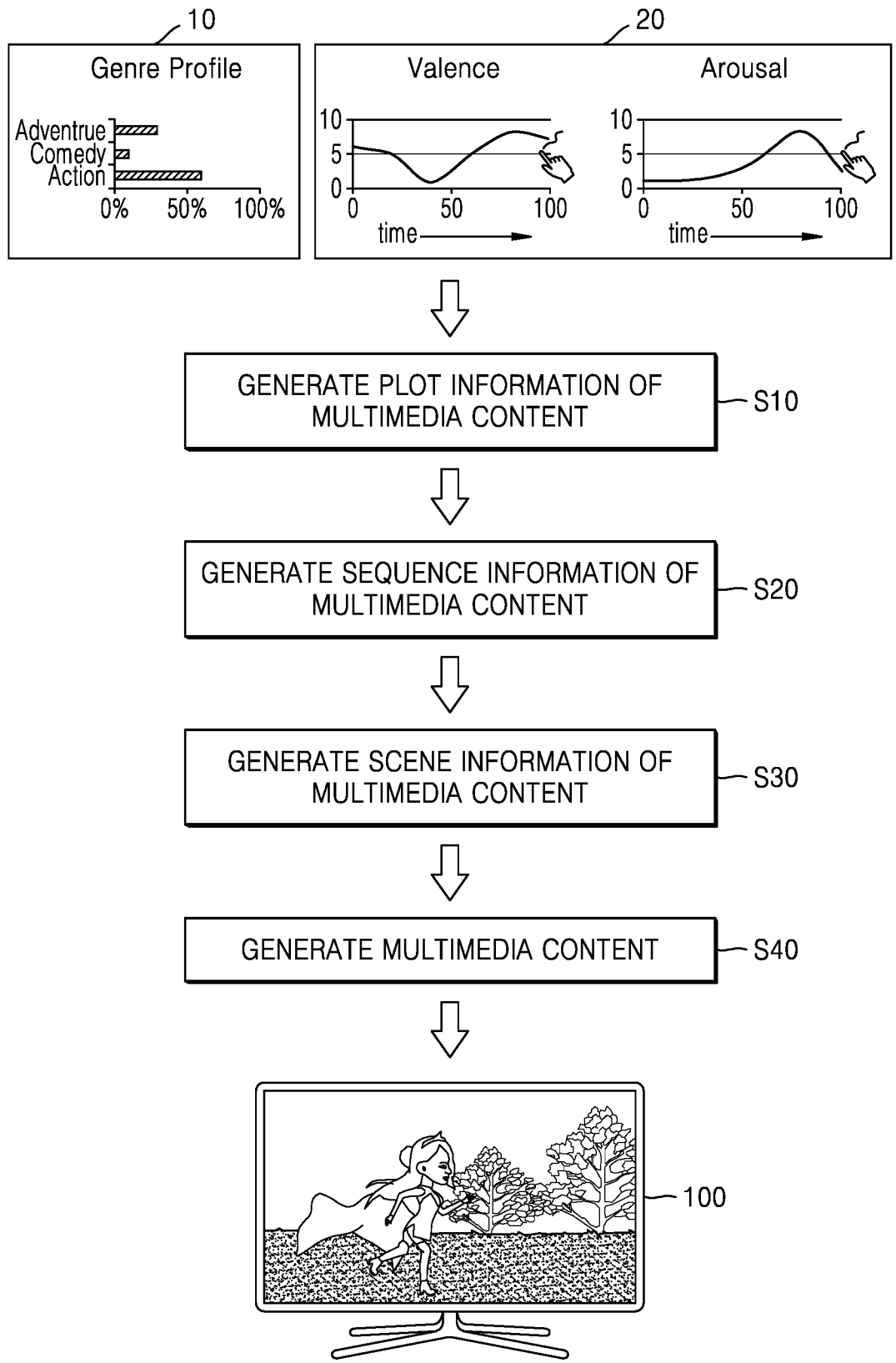
FIG. 1 is a diagram illustrating a process of generating multimedia content by a display apparatus, according to an embodiment.

Hereinafter, the terms used in the disclosure will be briefly described, and then the disclosure will be described in detail.

Although general terms widely used at present are selected for describing the disclosure in consideration of the functions thereof, these general terms may vary according to intentions of one of ordinary skill in the art, case precedents, the advent of new technologies, and the like. Terms arbitrarily selected by the applicant of the disclosure may also be used in a specific case. The terms will be defined based on their meanings and the context of the disclosure, not by simple meaning of the terms.

The terms "comprises" and/or "comprising" or "includes" and/or "including" when used in this disclosure, specify the presence of stated elements, but do not preclude the presence or addition of one or more other elements. The terms "unit", "-er (-or)", and "module" when used in this disclosure may refer to a unit in which at least one function or operation is performed, and may be implemented as hardware, software, or a combination of hardware and software.

Throughout the disclosure, the expression "at least one of a, b or c" indicates only a, only b, only c, both a and b, both a and c, both b and c, all of a, b, and c, or variations thereof.

One or more embodiments of the disclosure are described in detail herein with reference to the accompanying drawings so that this disclosure may be easily practiced by one of ordinary skill in the art to which the disclosure pertain. The disclosure may, however, be embodied in many different forms and should not be construed as being limited to the embodiments set forth herein. In the drawings, parts irrelevant to the description may be omitted for simplicity of explanation, and like numbers refer to like elements throughout.

The term "user" used herein denotes a person who controls a system, a function, or an operation. Examples of the user may include an inventor, a manager, an installation engineer, etc.

FIG. 1 is a diagram illustrating a process of generating multimedia content performed by a display apparatus, according to an embodiment.

A display apparatus 100 according to an embodiment of the disclosure may be a TV, but this is merely an example. The display apparatus 100 may be implemented as various types of devices including a display. For example, the display apparatus 100 may be any type of electronic device, such as a mobile phone, a tablet personal computer (PC), a digital camera, a camcorder, a laptop computer, a desktop computer, an e-book terminal, a digital broadcast terminal, a personal digital assistant (PDA), a portable multimedia player (PMP), a navigation device, an MP3 player, or a wearable device. In particular, the one or more embodiments of the display apparatus 100 may be easily implemented in a display apparatus having a large display, such as a TV. However, the one or more embodiments of the disclosure are not limited thereto. The display apparatus 100 may be stationary or mobile, or may be a digital broadcast receiver.

The display apparatus 100 may be implemented as not only a flat display apparatus, but also as a curved display apparatus having a curvature or a flexible display apparatus with an adjustable curvature. An output resolution of the display apparatus 100 may be, for example, high definition (HD), full HD, ultra HD, or a resolution that is clearer than ultra HD.

The term "user" used herein refers to a person who controls a function or operation of the display apparatus 100. Examples of the user may include an administrator, an installation engineer, or the like.

The "multimedia content" used herein may refer to a complex of various media such as an image, video, audio, and text. For example, the multimedia content may include a video, and the video may refer to, but is not limited to, a moving picture such as a movie, a drama, an animation, or an advertisement.

The display apparatus 100 according to an embodiment may obtain genre information 10 and emotion information 20 of the multimedia content.

For example, the display apparatus 100 may receive the genre information 10 and the emotion information 20 of the multimedia content from a user. The genre information 10 and the emotion information 20 may be received by the display apparatus 100 through a control device. The control device may be any of various types of devices for controlling the display apparatus 100, such as a remote controller or a mobile phone.

The genre information 10 of the multimedia content according to an embodiment is information indicating the genre of the multimedia content, and may be determined according to a story, characters, a theme, a screen composition, edition, atmosphere, and the like of the multimedia content. Examples of the genre of the multimedia content may include, but are not limited to, action, adventure, animation, comedy, crime, documentary, drama, family, fantasy, film noir, history, horror, musical, mystery, romance (melo), sci-fi, sports, and thriller.

The genre information 10 of the multimedia content may include a single genre or may include a plurality of genres. When the genre information 10 of the multimedia content includes a plurality of genres, the genre information 10 may include a weight of each of the plurality of genres. For example, as shown in FIG. 1, when the genre information 10 of the multimedia content includes three genres such as adventure, comedy, and action, a weight of the adventure genre may be set to be 35%, a weight of the comedy genre may be set to be 5%, and a weight of the action genre may be set to be 60%.

The emotion information 20 of the multimedia content according to an embodiment may represent an emotion according to a reproduction time of the multimedia content. For example, when the genre of the multimedia content is movie, the emotion information 20 of the multimedia content may refer to an emotion expressed in a movie as the movie is reproduced.

As shown in FIG. 1, the emotion information 20 may include valence information and arousal information. The valence information may include a graph showing valence over time, and a graph showing arousal over time.

Although FIG. 1 illustrates that the emotion information is expressed as the parameters of valence and arousal, embodiments of the disclosure are not limited thereto. The emotion information of the multimedia content may be expressed using parameters that are used in various emotion models. Although FIG. 1 illustrates an example where emotion information over time is received in the form of a graph, the one or more embodiments of the disclosure are not limited thereto. Emotion information over time may be received in various methods.

The display apparatus 100 according to an embodiment may generate plot information of the multimedia content, based on genre information and emotion information of the multimedia content (S10).

The plot information of the multimedia content represents a plot of the multimedia content, and the plot of the multimedia content refers to a story of the multimedia content or reconstruction of various events in the story in a structured manner. For example, when a story means a description of events in a simple temporal sequence, a plot does not depend only on the temporal sequence, but means a logical causal relationship given to the description of the events. Accordingly, various plots may be generated according to, for example, a temporal sequence and a logical causal relationship of events in a story.

A method, performed by the display apparatus 100 according to an embodiment, of generating plot information will be described in detail with reference to FIGS. 2 through 4.

The display apparatus 100 according to an embodiment may generate sequence information of the multimedia content, based on the plot information (S20).

The sequence information of the multimedia content represents sequence in which one or more image frames are arranged to constitute the multimedia content, and each sequence of the multimedia content refers to a unit of content in which small events related to each other are concatenated from among the events constituting the multimedia content. For example, each sequence refers to a set (chain) of detailed events that have some degree of independence in content in a large flow of a story. Shorts or scenes are gathered to form a sequence, and these sequences are gathered to form a story.

A method, performed by the display apparatus 100 according to an embodiment, of generating sequence information will be described in detail with reference to FIGS. 5 and 6.

The display apparatus 100 according to an embodiment may generate scene information of the multimedia content, based on the sequence information (S30).

The scene information of the multimedia content represents scenes that constitute a sequence. Each sequence of the multimedia content refers to one event that ends at a certain time from among events constituting the multimedia content, and one sequence may include a plurality of scenes. One scene may include a plurality of shorts. The scene information according to an embodiment may include script information.

A method, performed by the display apparatus 100 according to an embodiment, of generating scene information will be described in detail with reference to FIGS. 5 through 8.

The display apparatus 100 according to an embodiment may generate the multimedia content, based on the scene information of the multimedia content (S40), and may output the generated multimedia content to a display.

A method, performed by the display apparatus 100 according to an embodiment, of generating the multimedia content will be described in detail with reference to FIGS. 5 and 9.

Figure 2:
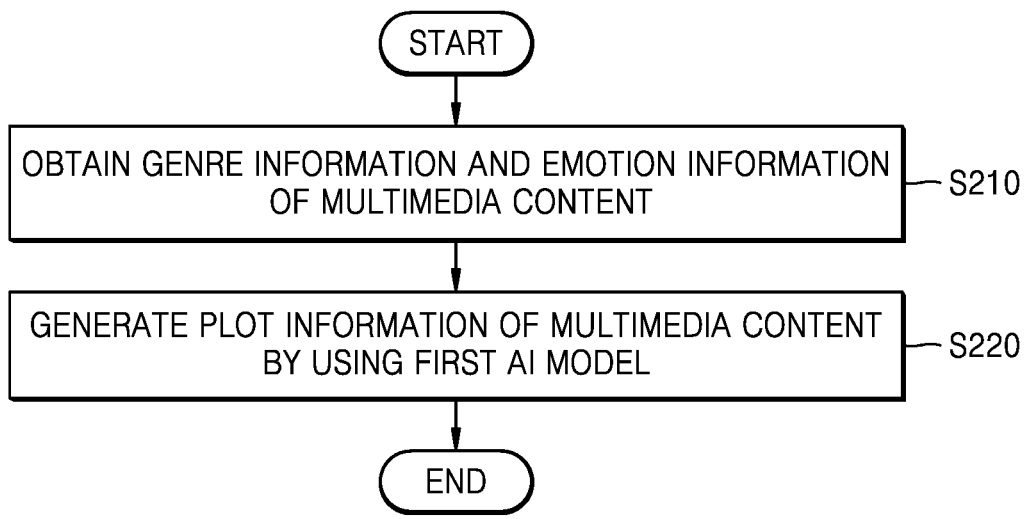
FIG. 2 is a flowchart of a method of generating plot information of multimedia content, according to an embodiment.
Figure 3:
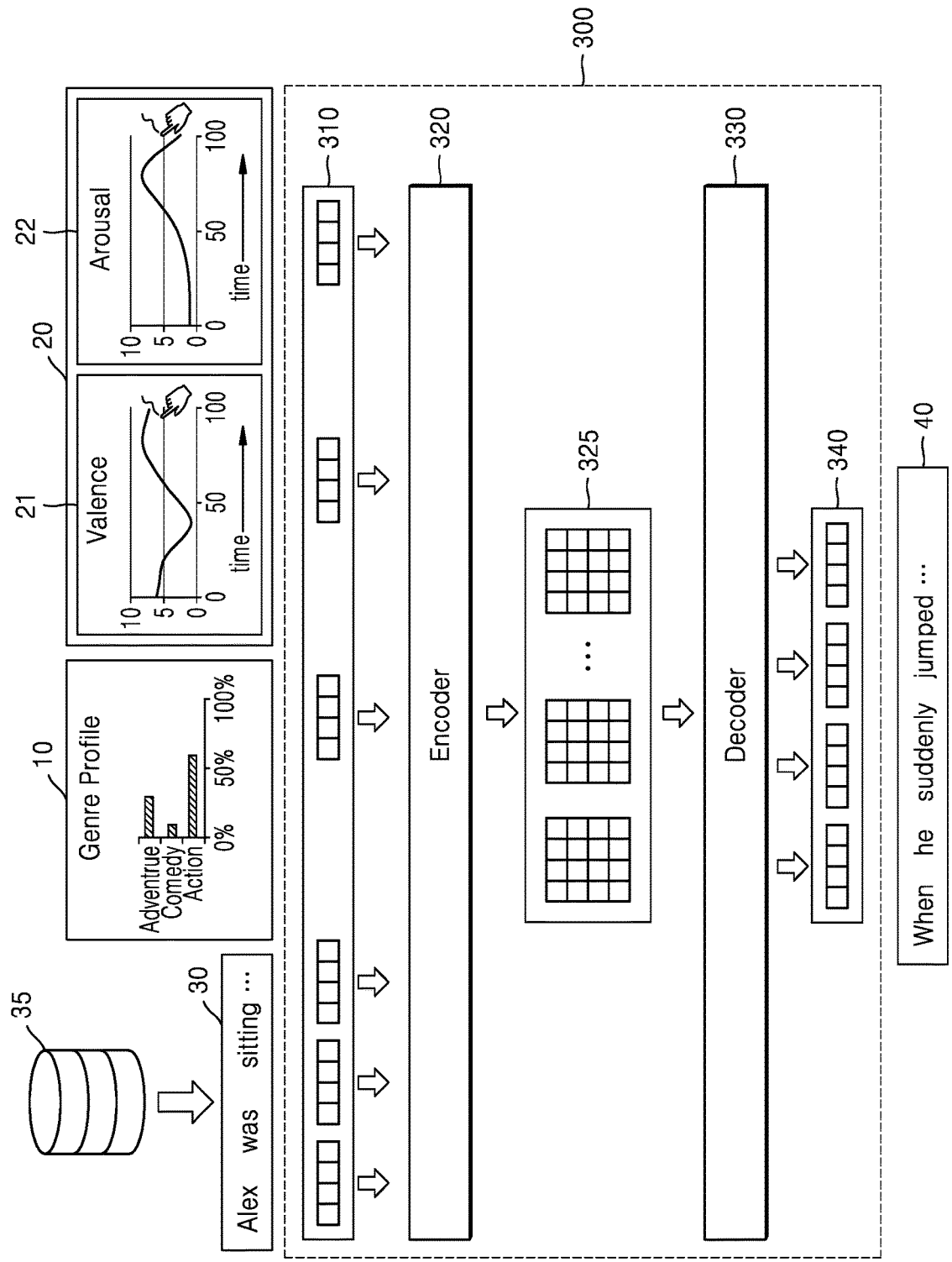
FIG. 3 is a diagram of generating plot information of multimedia content according to an embodiment.

FIG. 2 is a flowchart of a method of generating plot information of multimedia content according to an embodiment, and FIG. 3 is a diagram illustrating an example of generating plot information of multimedia content according to an embodiment.

Referring to FIG. 2, the display apparatus 100 according to an embodiment may obtain genre information and emotion information of multimedia content desired to be generated (S210).

The genre information 10 according to an embodiment may include a single genre or may include a plurality of genres. For example, as shown in FIG. 3, the genre information 10 of the multimedia content may include three genres such as adventure, comedy, and action. When the genre information 10 of the multimedia content includes a plurality of genres, a weight may be set for each of the plurality of genres. For example, a weight of 35% may be set for the adventure genre, a weight of 5% may be set for the comedy genre, and a weight of 60% may be set for the action genre.

The emotion information 20 according to an embodiment may include valence information and arousal information. For example, as shown in FIG. 3, the emotion information 20 of the multimedia content may include a graph showing valence over time and a graph showing arousal over time. Here, time may represent a reproduction time of the multimedia content.

The valence information and the arousal information will now be described in detail with reference to FIG. 4.

Figure 4:
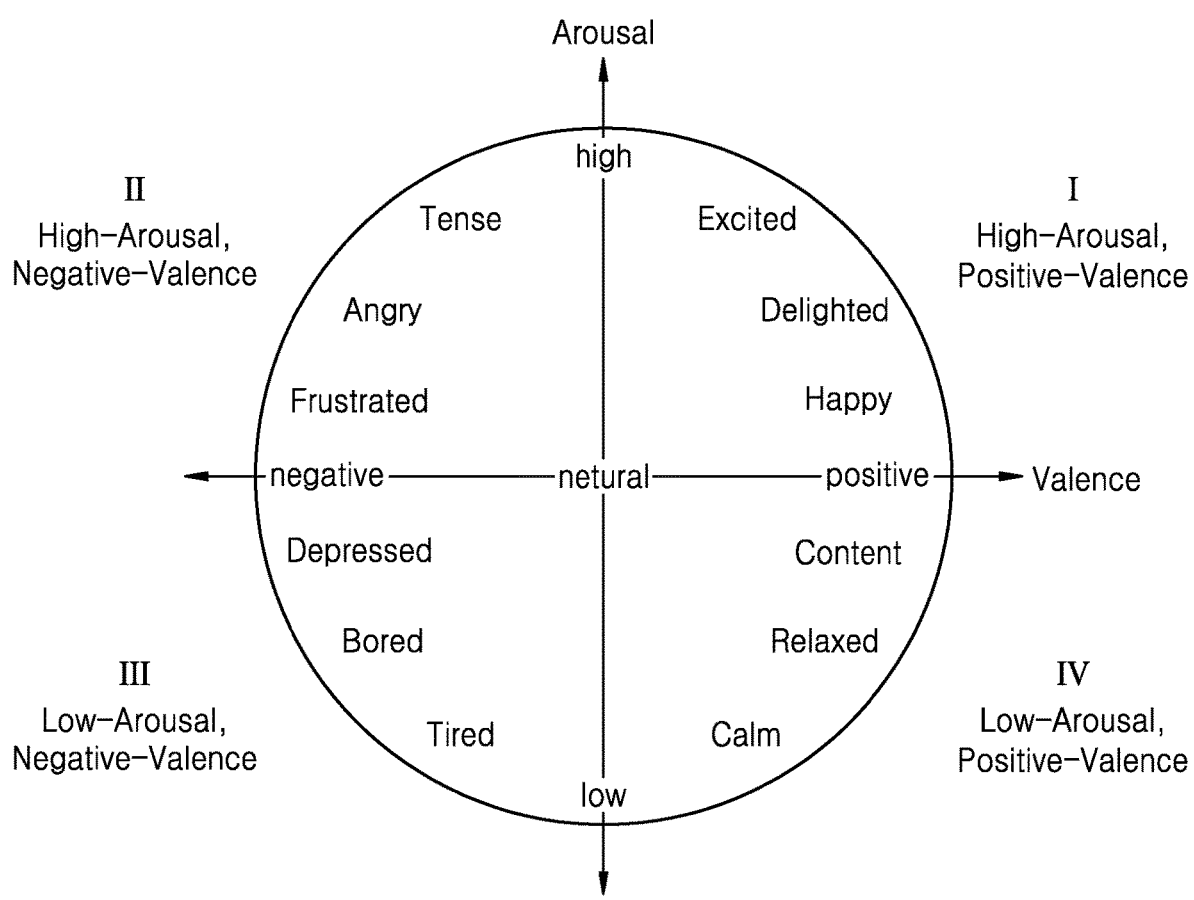
FIG. 4 is an emotion graph according to an embodiment.

FIG. 4 is an emotion graph according to an embodiment.

The emotion graph of FIG. 4 is a graph showing emotions of a human represented as coordinates mapped according to the criteria of arousal and valence. For example, the display apparatus 100 may determine the location of an emotion on a coordinate system, according to the degree of arousal of the emotion and whether the arousal is positive or negative. For example, emotions, such as "happy", "delighted", and "content", may have positive values in the valence axis (e.g., horizontal axis), and emotions, such as "frustrated", "angry", and "depressed", may have negative values in the valence axis. Emotions, such as "tense", "excited", "angry", may have positive values in the arousal axis (e.g., vertical axis), and emotions, such as "tired", "calm", and "bored", may have negative values in the arousal axis.

For example, the "happy" emotion has positive values in both the arousal axis and the valence axis.

Accordingly, the arousal graph and the valence graph according to time may indicate the degree of arousal of an emotion expressed by the multimedia content and whether the arousal is positive or negative, according to the reproduction time of the multimedia content.

Although FIG. 3 illustrates that emotion information is expressed as the parameters of valence and arousal, embodiments of the disclosure are not limited thereto. The emotion information may be expressed using parameters that are used in various emotion models.

Referring back to FIG. 2, the display apparatus 100 according to an embodiment may generate plot information of the multimedia content corresponding to the genre information and the emotion information, by using a first artificial intelligence (AI) model (S220).

This will now be described in greater detail with reference to FIG. 3.

FIG. 3 illustrates a method of generating the plot information of the multimedia content by using a first AI model 300 according to an embodiment.

Referring to FIG. 3, story information 30 of the multimedia content, the genre information 10 of the multimedia content, and the emotion information 20 of the multimedia content may be input to the first AI model 300 of the display apparatus 100.

The first AI model 300 according to an embodiment may obtain the story information 30 of the multimedia content, and the story information 30 of the multimedia content may include a story randomly extracted from a story database (DB) 35. For example, the story information 30 may include captions, words and images representing scenes of a story. The story DB 35 may be a DB storing various stories in advance, or may be a DB included in the display apparatus 100 or in an external apparatus.

The first AI model 300 according to an embodiment of the disclosure may be a model having a sequence-to-sequence structure, or may be a model trained to receive the story information 30 of the multimedia content composed of sequences and output the plot information 40 of the multimedia content according to the sequences.

When the story information 30 of the multimedia content, the genre information 10 of the multimedia content, and the emotion information 20 of the multimedia content are input to the first AI model 300, embedding may be performed to vectorize the story information 30 of the multimedia content, the genre information 10 of the multimedia content, and the emotion information 20 of the multimedia content.

The first AI model 300 may include an encoder 320 and a decoder 330. The encoder 320 and the decoder 330 may include one or more neural networks. Embedded vectors 310 may be input to the encoder 320. For example, the words of each of the sentences included in the story information 30 of the multimedia content may be included in the vectors 310 and sequentially input to the encoder 320. The encoder 320 may output pieces of word information included in the story information 30 of the multimedia content as a context vector 325 in which the genre information and the emotion information of the multimedia content have been compressed by the encoder 320.

The decoder 330 may process the received context vector 325 to output a plurality of vectors 340. The plurality of vectors 340 may be converted into words, based on a softmax function or the like. At this time, the plot information 40 of the multimedia content may be generated based on the words. For example, sentences including the words may represent a plot of the multimedia content.

The first AI model 300 may output the generated plot information 40 of the multimedia content.

Figure 5:
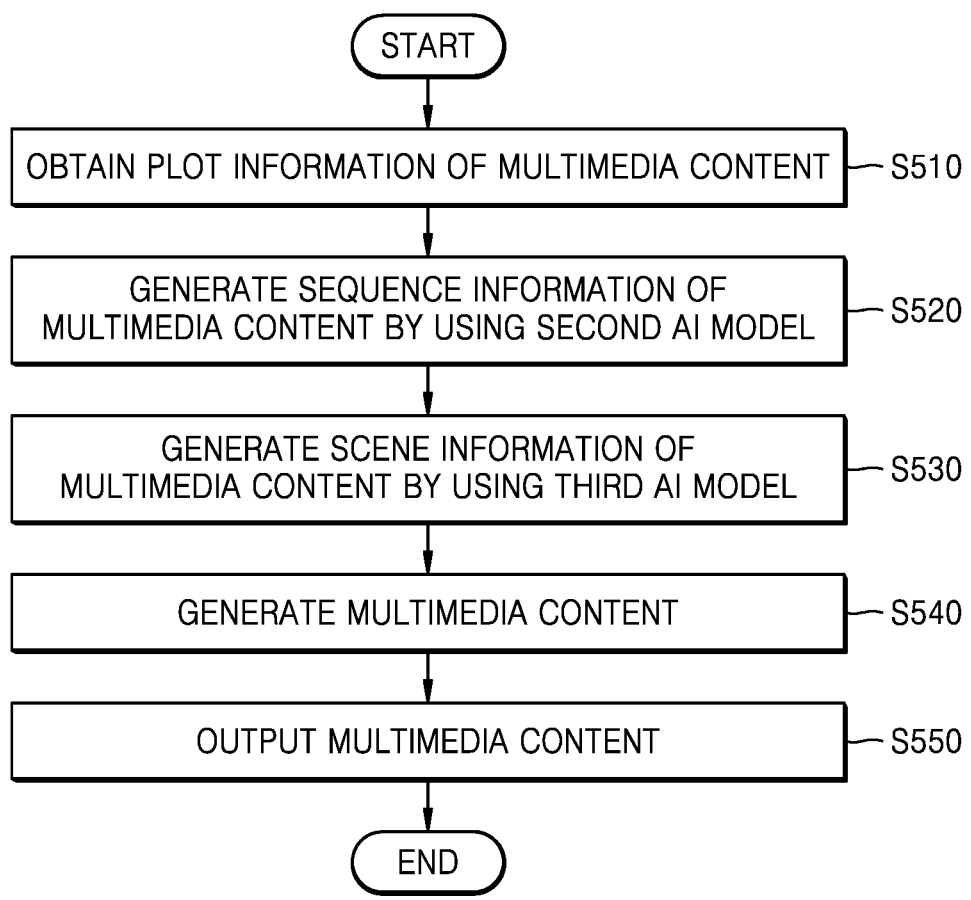
FIG. 5 is a flowchart of an operation method of a display apparatus, according to an embodiment.

FIG. 5 is a flowchart of an operation method of a display apparatus, according to an embodiment.

Referring to FIG. 5, a display apparatus according to an embodiment of the disclosure may obtain plot information of multimedia content (S510).

The plot information of the multimedia content may be story information of the multimedia content, and plot information generated based on genre information and emotion information of the multimedia content. In addition, the plot information may be a plot of the multimedia content directly input by a user or a plot of the multimedia content received from an external apparatus. However, the one or more embodiments of the disclosure are not limited thereto. The display apparatus according to an embodiment of the disclosure may obtain the plot information of multimedia content by using any of various methods.

The display apparatus 100 according to an embodiment may generate sequence information of the multimedia content corresponding to the plot information, by using a second AI model (S520).

Operation S520 will now be described in greater detail with reference to FIG. 6.

Figure 6:
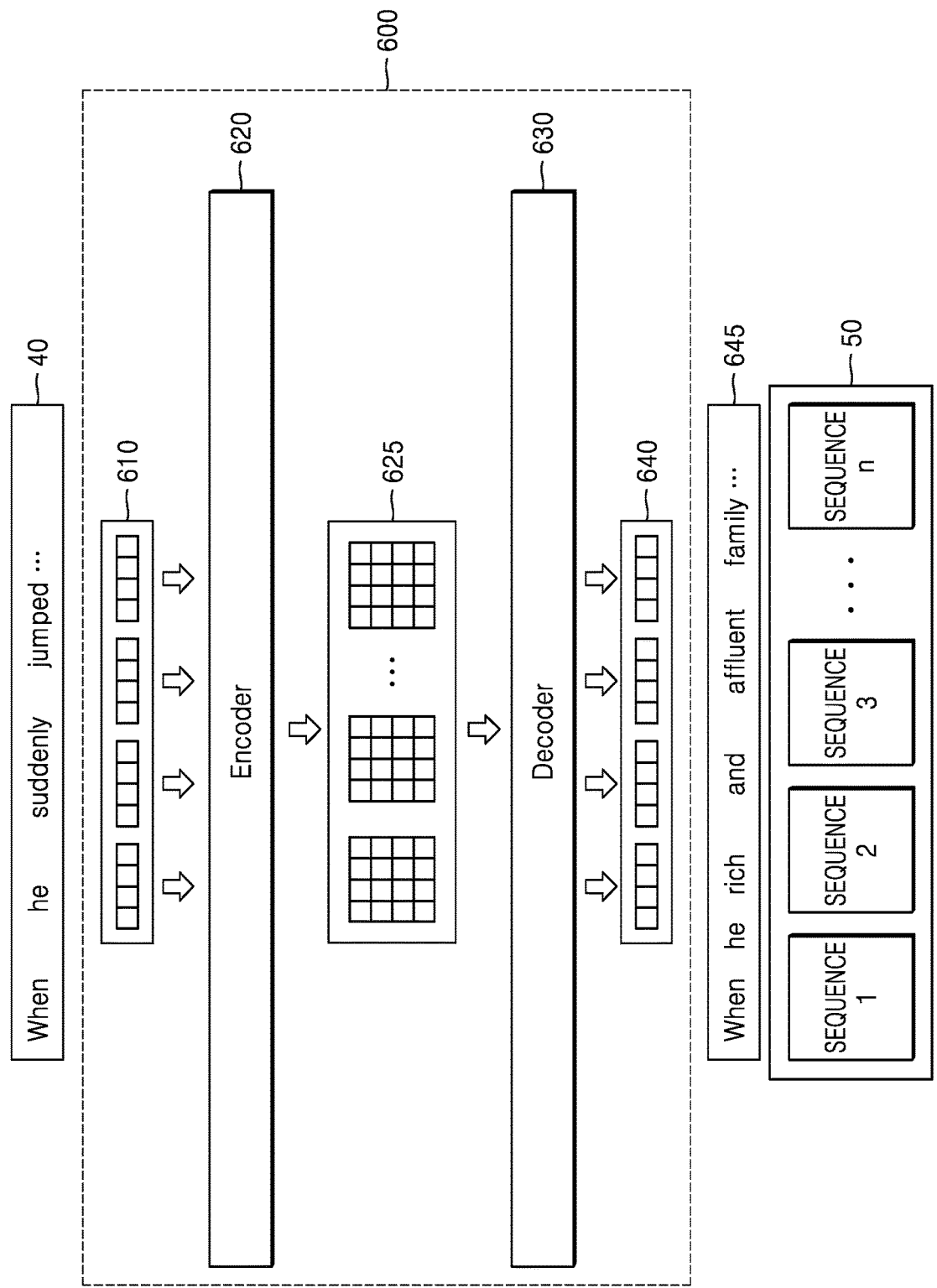
FIG. 6 illustrates a method of generating sequence information of multimedia content by using a second AI model, according to an embodiment.

FIG. 6 illustrates a method of generating the sequence information of the multimedia content by using a second AI model 600 according to an embodiment.

Referring to FIG. 6, the plot information 40 of the multimedia content may be input to the second AI model 600.

The second AI model 600 according to an embodiment of the disclosure may be a model having a sequence-to-sequence structure, or may be a model trained to receive the plot information 40 of the multimedia content and output the sequence information 50 of the multimedia content.

The plot information 40 of the multimedia content according to an embodiment of the disclosure may include a plurality of sentences, each of which may include a plurality of words. The plurality of words constituting the plot information 40 of the multimedia content may be converted into a plurality of vectors 610.

The second AI model 600 may include an encoder 620 and a decoder 630. The encoder 620 and the decoder 630 may include one or more neural networks. The plurality of vectors 610 may be sequentially input to the encoder 620. The encoder 620 may output a context vector 625 in which pieces of word information included in the plot information of the multimedia content have been compressed.

The decoder 630 may process the received context vector 625 to output a plurality of vectors 640. The plurality of vectors 640 may be converted into words 645, based on a softmax function or the like. The sequence information 50 of the multimedia content may be generated based on the words 645. For example, sentences including the words may represent sequence information of the multimedia content.

The second AI model 600 according to an embodiment may output the sequence information 50 about the plurality of sequences corresponding to the plot information.

Referring back to FIG. 5, the display apparatus 100 according to an embodiment may generate scene information of the multimedia content corresponding to the sequence information of the multimedia content, by using a third AI model (S530).

Operation S530 will now be described in greater detail with reference to FIG. 7.

Figure 7:
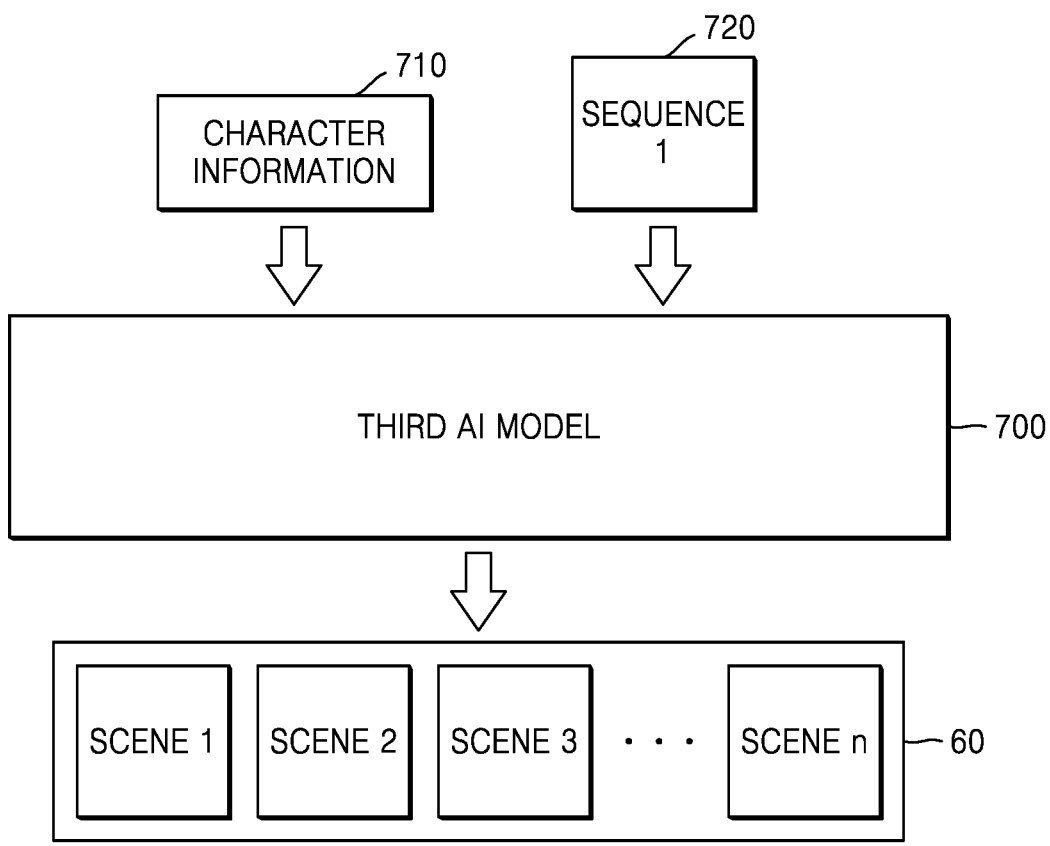
FIG. 7 illustrates a method of generating scene information of multimedia content by using a third AI model, according to an embodiment.

FIG. 7 illustrates a method of generating scene information of multimedia content by using a third AI model according to an embodiment.

Referring to FIG. 7, the display apparatus 100 according to an embodiment may generate information 60 about a plurality of scenes included in one sequence information 720, based on character information 710 and the one sequence information 720.

The display apparatus 100 according to an embodiment may obtain the character information 710, based on plot information of the multimedia content. For example, the display apparatus 100 may obtain information about the name, gender, age, personality, and the like of a character, based on the plot information of the multimedia content obtained in operation S510. More specifically, the display apparatus 100 may extract the character information 710 from the plot information of the multimedia content by using one or more neural networks. However, embodiments of the disclosure are not limited thereto, and the character information 710 may be obtained according to a user input.

The display apparatus 100 according to an embodiment may generate information about a plurality of scenes by using a third AI model 700. Referring to FIG. 7, the third AI model 700 may be a model trained to receive the character information and one piece of sequence information and output the information about the plurality of scenes.

The third AI model 700 may include one or more neural networks including hidden layers. Input data (for example, the character information and the sequence information) may be input to the third AI model 700 and processed by the hidden layers of the third AI model 700, and output data (for example, the scene information) may be generated. The third AI model 700 may include a deep neural network including two or more hidden layers.

Accordingly, the display apparatus 100 may generate the information about the plurality of scenes corresponding to the one sequence information 720, by inputting the character information 710 and the one sequence information 720 to the third AI model 700.

For example, as shown in FIG. 7, when one sequence information 720 (for example, first sequence information about sequence 1) and the character information 710 are input to the third AI model 700, information 60 about scenes 1 through n constituting the sequence 1 may be output.

The scene information 60 according to an embodiment may include, for example, background information of scenes, information about characters appearing in the scenes and the behaviors of the characters, and conversation contents of the characters (e.g., a dialogue between characters). The scene information will now be described in greater detail with reference to FIG. 8.

Figure 8:
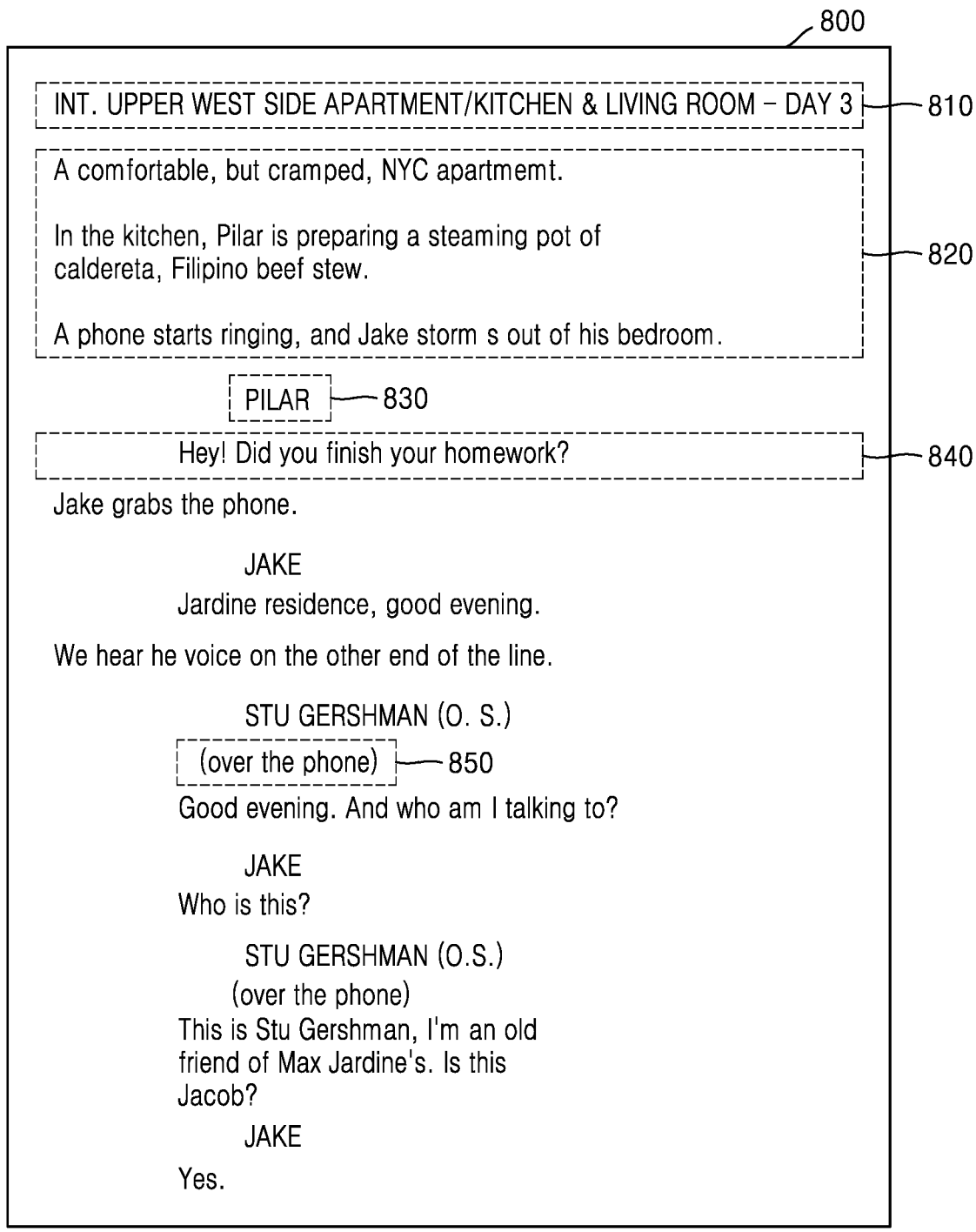
FIG. 8 is a diagram illustrating an example of scene information according to an embodiment.

FIG. 8 is a diagram illustrating an example of scene information according to an embodiment of the disclosure.

Referring to FIG. 8, the scene information may include script information 800.

The script information 800 of a scene may include background information 810 which may be information about time or place of a scene. The script information 800 may also include depictions 820 and 850 of the behaviors of characters in the scene. The script information 800 may also include a dialogue 840 of a character together with a name 830 of the character.

The script information 800 of FIG. 8 is merely an example of the scene information, and the scene information according to an embodiment may have various other information in different formats.

Referring back to FIG. 5, the display apparatus 100 may generate the multimedia content, based on the scene information (S540).

Operation S540 of FIG. 5 will now be described in greater detail with reference to FIG. 9.

Figure 9:
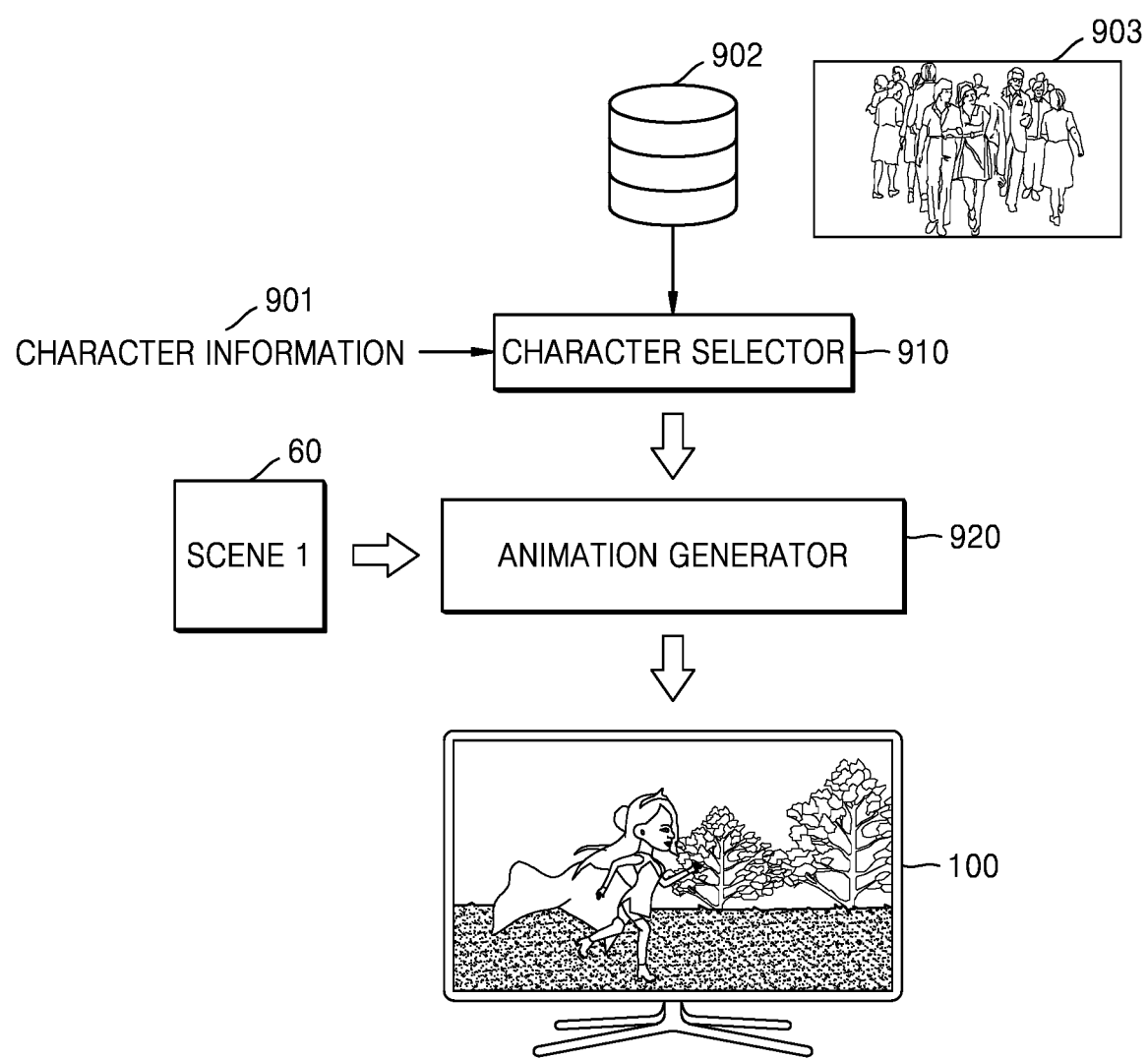
FIG. 9 is a diagram illustrating a method of generating multimedia content, based on scene information, according to an embodiment.

FIG. 9 is a diagram illustrating a method of generating multimedia content based on scene information, according to an embodiment.

Referring to FIG. 9, the display apparatus 100 according to an embodiment may include a character selector 910 and an animation generator 920.

The display apparatus 100 may obtain character information 901 of the multimedia content. The character information 901 may include information about the names, genders, ages, personalities, and the like of characters appearing in the multimedia content. At this time, the display apparatus 100 may obtain character information from the plot information of the multimedia content by using one or more neural networks. However, embodiments of the disclosure are not limited thereto, and the display apparatus 100 may obtain character information according to various methods. For example, the display apparatus 100 may obtain the character information based on a user voice input received through one or more microphones of the display apparatus 100.

The character selector 910 according to an embodiment may select a character of the multimedia content from a character database (DB) 902, based on the character information 901. The character DB 902 may store information about a plurality of characters 903. For example, the character DB 902 may previously store information about the name, gender, age, personality, and the like of each of the plurality of characters 903 together with image data about the plurality of characters 903.

Accordingly, the character selector 910 may select a character matching the obtained character information of the multimedia content from the plurality of characters 903, and may output the image data about the plurality of characters 903 together with information about the selected character to the animation generator 920.

The animation generator 920 according to an embodiment may generate multimedia data based on the scene information 60. The animation generator 920 may convert the scene information 60 formed of text into an animation.

For example, the animation generator 920 may generate a background image of the multimedia content from a scene included in the scene information 60. The animation generator 920 may render image data about a character included in the scene information 60, based on information about the behavior of the character. The animation generator 920 may generate a voice of the character included in the scene information 60, based on dialog contents of the character, and may perform lip synchronization to match with the voice. For example, the animation generator 920 may convert the dialog of the character into a voice and lip-sync by using a Text-to-Speech (TTS) technique.

Accordingly, the animation generator 920 may generate a multimedia content sequence corresponding to the plurality of scenes, and the display apparatus 100 may output the generated multimedia content sequence to the display.

Figure 10:
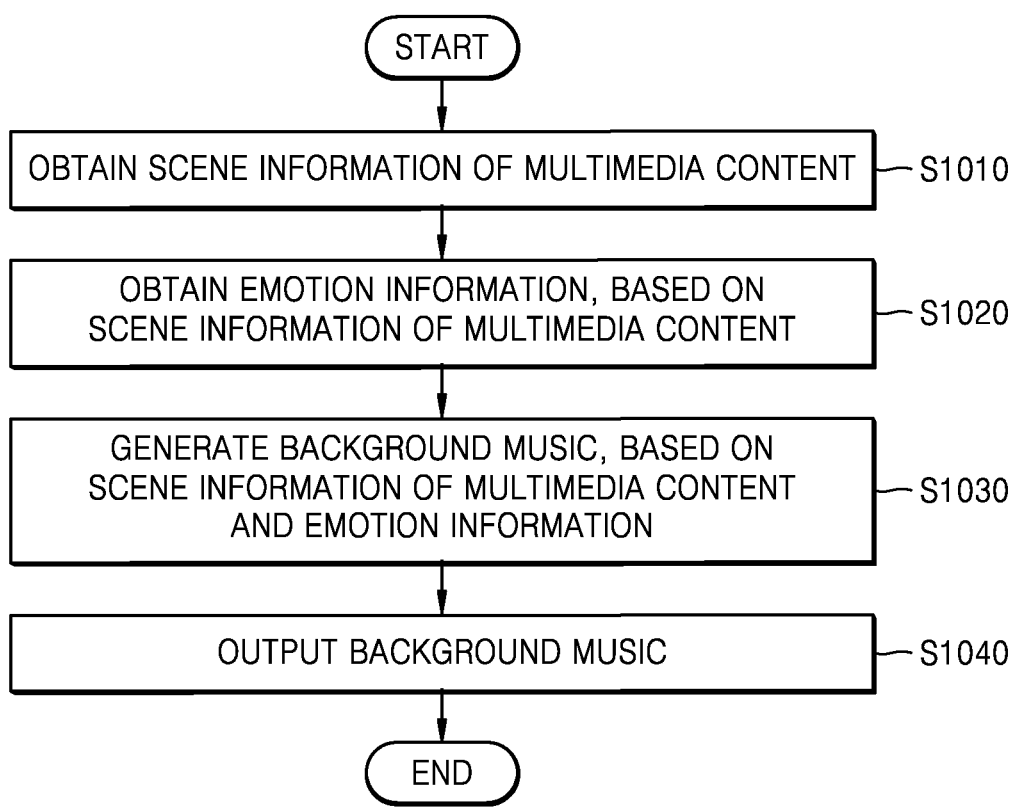
FIG. 10 is a flowchart of a method of generating background music (or background audio) of multimedia content, according to an embodiment.
Figure 11:
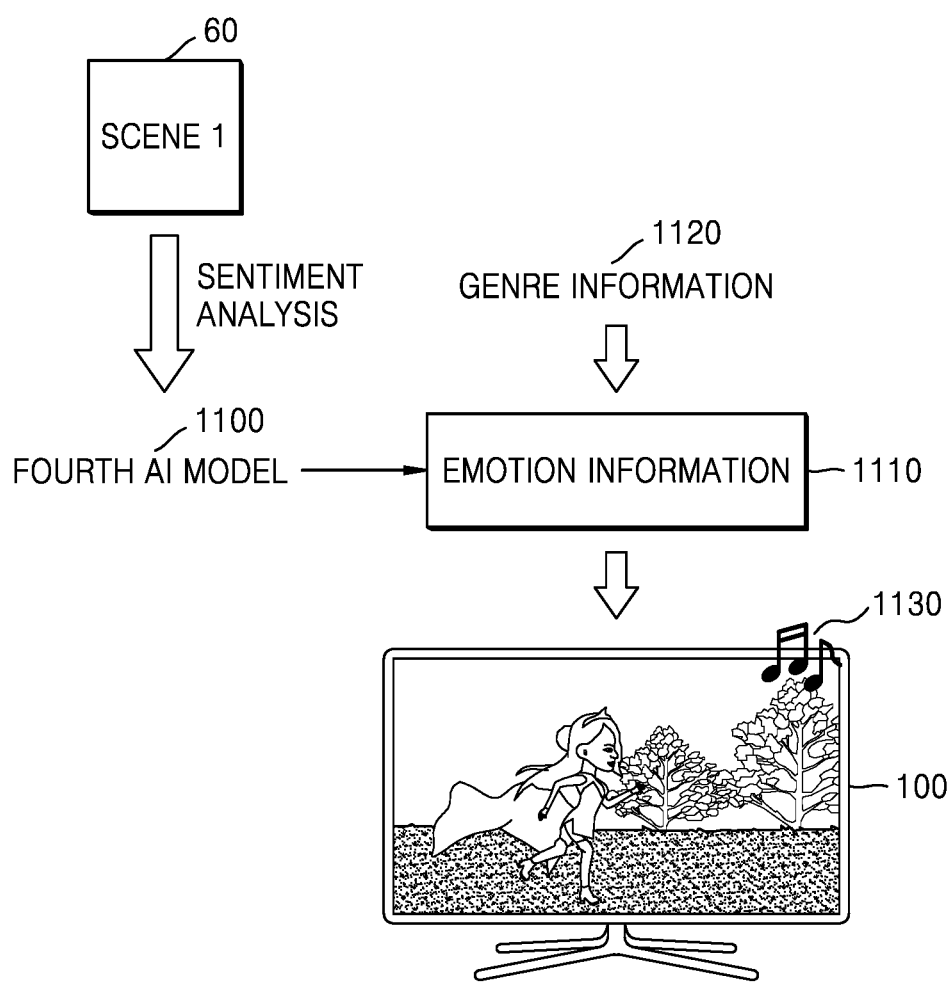
FIG. 11 is a diagram illustrating an example of generating background music of multimedia content according to an embodiment.

FIG. 10 is a flowchart of a method of generating background music of multimedia content according to an embodiment, and FIG. 11 is a diagram illustrating an example of generating background music of multimedia content according to an embodiment.

Referring to FIG. 10, the display apparatus according to an embodiment may obtain scene information of the multimedia content (S1010).

For example, as described above with reference to FIGS. 5 through 8, the display apparatus 100 may generate the sequence information of the multimedia content from the plot information of the multimedia content by using the second AI model, and may generate the scene information of the multimedia content from the sequence information of the multimedia content by using the third AI model. Alternatively, the display apparatus 100 may receive the scene information of the multimedia content from an external apparatus or may obtain the scene information of the multimedia content, based on a user input. However, the one or more embodiments of the disclosure are not limited thereto. The display apparatus 100 may obtain the scene information of the multimedia content by using any of various methods.

The scene information of the multimedia content may include, for example, background information of scenes, information about characters appearing in the scenes and the behaviors of the characters, and conversation contents of the characters (e.g., dialogues of characters), and may be expressed in the form of a script of the multimedia content.

The display apparatus 100 may obtain emotion information, based on the scene information of the multimedia content (S1020).

Referring to FIG. 11, the display apparatus 100 may obtain emotion information 1110 about a scene by performing sentiment analysis on the scene information 60. The sentiment analysis may be performed using a model including one or more neural networks. The one or more neural networks may be a model trained to receive scene information and output emotion information corresponding to the scene. For example, the display apparatus 100 may obtain an emotion expressed by the scene information (for example, an emotion such as "happiness", "gladness", "anger", or "sadness") by performing sentiment analysis.

The display apparatus 100 according to an embodiment may generate the background music, based on the scene information of the multimedia content and the emotion information (S1030).

The background music may include audio, and the audio may include, but is not limited to, music and a sound (for example, a natural sound, an artificial sound, or a voice).

Referring to FIG. 11, the display apparatus 100 may generate background music corresponding to a scene by using a fourth AI model 1100. The fourth AI model 1100 may be a model trained to receive genre information 1120 of the multimedia content and emotion information 1110 and output background music 1130 of the scene according to the genre information 1120 and the emotion information 1110.

The fourth AI model 1100 may include one or more neural networks including hidden layers. Input data (for example, the sequence information of the multimedia content and the emotion information) may be input to the fourth AI model 1100 and pass through the hidden layers and output data (for example, the background music) may be generated. The fourth AI model 1100 may include a deep neural network including two or more hidden layers.

The fourth AI model 1100 may also include conditional generative adversarial nets (CGANs). The CGANs may include a generator model and a discriminator model, and configured to automatically generate audio (for example, the background music) or image conforming to a condition (for example, the genre information of the multimedia content and the emotion information). The generator model may be responsible for generating new plausible examples that may be indistinguishable from real examples in a dataset, while the discriminator model may be capable of classifying an image as either real (e.g., same or substantially similar as the dataset input to the CGAN) or imaginary (e.g., reconstructed based on the dataset or other dataset available).

The display apparatus 100 may output the background music generated by the fourth AI model together with the generated multimedia content (S1040).

Figure 12:
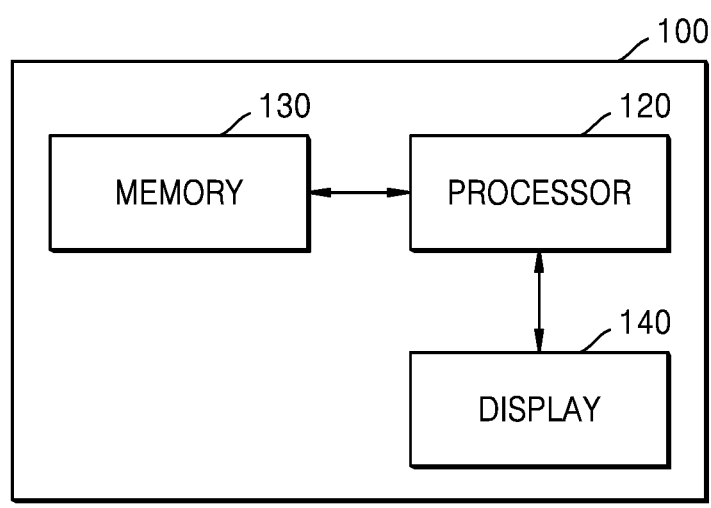
FIG. 12 is a block diagram of a display apparatus according to an embodiment.

FIG. 12 is a block diagram of a structure of a display apparatus according to an embodiment of the disclosure.

Referring to FIG. 12, the display apparatus 100 according to an embodiment may include a processor 120, a memory 130, and a display 140.

The processor 120 according to an embodiment may execute one or more programs stored in the memory 130. The processor 120 may include a single core, a dual core, a triple core, a quad core, or a multiple core thereof. The processor 120 may include a plurality of processors. For example, the processor 120 may be implemented by using a main processor and a sub-processor operating in a stand-by mode.

The memory 130 according to an embodiment may store various pieces of data, programs, or applications for driving and controlling the display apparatus 100.

A program stored in the memory 130 may include one or more instructions. The program (one or more instructions or codes) or application stored in the memory 130 may be executed by the processor 120.

The processor 120 may obtain the plot information of the multimedia content by using the first AI model, by executing the one or more instructions stored in the memory 130. For example, when the genre information of the multimedia content and the emotion information of the multimedia content are input to the first AI model, the first AI model may output the plot information of the multimedia content.

The processor 120 may obtain the sequence information of the multimedia content corresponding to the plot information of the multimedia content by using the second AI model, and may obtain the scene information of the multimedia content by using the third AI model.

The processor 120 may include the character selector 910 and the animation generator 920 of FIG. 9. For example, the processor 120 may be configured to select a character of the multimedia content based on character information, generate the multimedia content based on the selected character and the scene information of the multimedia content, and control the display 140 to output the generated multimedia content.

The processor 120 according to an embodiment may obtain emotion information, based on the scene information of the multimedia content. The processor 120 may generate the background music corresponding to the genre information of the multimedia content and the emotion information by using the fourth AI model.

The processor 120 may control the background music together with the multimedia content to be output.

The display 140 according to an embodiment may generate a driving signal by converting an image signal, a data signal, an on-screen display (OSD) signal, and a control signal each processed by the processor 120. The display 140 may be a plasma display panel (PDP), a liquid-crystal display (LCD), an organic light-emitting device (OLED) display, a flexible display, or a three-dimensional (3D) display. The display 140 may be configured as a touch-screen, and thus may serve as an input device as well as an output device.

The display 140 may display a playback screen image of the generated multimedia content.

Figure 13:
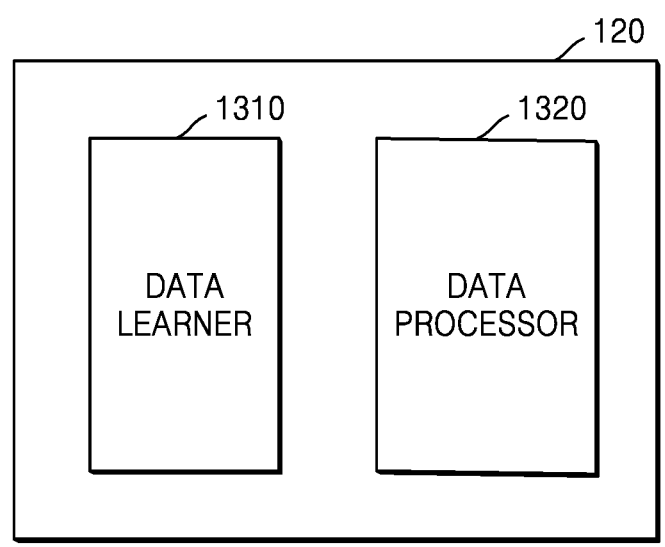
FIG. 13 is a block diagram of a processor according to an embodiment.

FIG. 13 is a block diagram illustrating a processor according to an embodiment.

Referring to FIG. 13, the processor 120 may include a data learner 1310 and a data processor 1320.

Although FIG. 13 illustrates that the data learner 1310 and the data processor 1320 are configured with a single processor, the data learner 1310 and the data processor 1320 may be configured with separate processors.

The data learner 1310 may train the first AI model, the second AI model, the third AI model, and the fourth AI model according to an embodiment. The data learner 1310 may train the first AI model by using learning data including sample story information of the multimedia content, sample emotion information of the multimedia content, and sample plot information of the multimedia content. Here, the learning data may be iteratively fed into an initial first AI model until the initial first AI model satisfies a predetermined condition, thereby training the first AI model. For example, when the sample story information of the multimedia content and the sample emotion information of the multimedia content are input to the first AI model, the data learner 1310 may train the first AI model so that sample plot information of the multimedia content corresponding to the sample story information of the multimedia content and the sample emotion information of the multimedia content is output. When the first AI model is generated by training a first initial model based on learning data including various sample story information and sample emotion information, the trained first AI model can be used to output plot information based on the actual story information and emotion information of multimedia content.

The data learner 1310 may also train the second AI model by using learning data including sample plot information of the multimedia content and sample sequence information of the multimedia content. For example, when the sample plot information of the multimedia content is input to the second AI model, the data learner 1310 may train the second AI model so that sample sequence information of the multimedia content corresponding to the sample plot information of the multimedia content is output. Here, the second AI model may be generated in a manner similar to the first AI model.

The data learner 1310 may also train the third AI model by using learning data including sample character information of the multimedia content, sample sequence information of the multimedia content, and sample scene information of the multimedia content. For example, when the sample character information of the multimedia content and the sample sequence information of the multimedia content are input to the third AI model, the data learner 1310 may train the third AI model so that sample scene information of the multimedia content corresponding to the sample sequence information of the multimedia content is output. The third AI model may be generated in a manner similar to the first AI model.

The data learner 1310 may also train the fourth AI model by using learning data including sample emotion information of a scene and sample genre information of the multimedia content. For example, when the sample emotion information of the scene and the sample genre information of the multimedia content are input to the fourth AI model, the data learner 1310 may train the fourth AI model so that sample background music of the scene is output. Here, the fourth AI model may be generated in a manner similar to the first AI model.

The first through fourth AI models according to an embodiment may be established considering, for example, an application field of a model, a purpose of learning, or the computer performance of a device. The first through fourth AI models may be, for example, models based on a neural network. For example, a model, such as a deep neural network (DNN), a recurrent neural network (RNN), or a bidirectional recurrent DNN (BRDNN), may be used as a data processing model, but embodiments of the disclosure are not limited thereto.

The data learner 1310 may train the first through fourth AI models by using a learning algorithm or the like including, for example, error back-propagation or gradient descent.

When the first through fourth AI models according to an embodiment are trained, the data learner 1310 may store the trained first through fourth AI models. Further, the data learner 1310 may store the trained first through fourth AI models in a memory of a display apparatus. Alternatively, the data learner 1310 may store the trained first through fourth AI models in a memory of a server that is connected with the display apparatus via a wired or wireless network.

The data processor 1320 may input the story information of the multimedia content and the emotion information of the multimedia content to the trained first AI model, and output the plot information of the multimedia content as a result value. The output result value may be used to update the first AI model.

The data processor 1320 may input the plot information of the multimedia content to the trained second AI model, and output the sequence information of the multimedia content as a result value. The output result value may be used to update the second AI model.

The data processor 1320 may input the character information of the multimedia content and the sequence information of the multimedia content to the trained third AI model, and output the scene information of the multimedia content as a result value. The output result value may be used to update the third AI model.

The data processor 1320 may input the emotion information of the scene and the genre information of the multimedia content to the trained fourth AI model, and output the background music of the scene as a result value. The output result value may be used to update the fourth AI model.

At least one of the data learner 1310 and the data processor 1320 may be in the form of at least one hardware chip and may be mounted on the display apparatus. For example, at least one of the data learner 1310 and the data processor 1320 may be in the form of a dedicated hardware chip for AI, or may be a portion of an existing general-purpose processor (for example, a central processing unit (CPU) or an application processor (AP)) or a processor dedicated to graphics (for example, a graphic processing unit (GPU)) and may be mounted on a display apparatus.

The data learner 1310 and the data processor 1320 may be both mounted on a single display apparatus, or may be respectively mounted on independent display apparatuses. For example, one of the data trainer 1310 and the data processor 1320 may be included in a display apparatus, and the other may be included in a server. The data learner 1310 and the data processor 1320 may be connected to each other by wire or wirelessly, and thus model information established by the data learner 1310 may be provided to the data processor 1320 and data input to the data processor 1320 may be provided as additional learning data to the data learner 1310.

At least one of the data learner 1310 and the data processor 1320 may be implemented as a software module. When at least one of the data learner 1310 and the data processor 1320 is implemented using a software module (or a program module including instructions), the software module may be stored in non-transitory computer readable media. The at least one software module may be provided by an operating system (OS) or by a certain application. Alternatively, some of the at least one software module may be provided by an OS and the others may be provided by a certain application.

Figure 14:
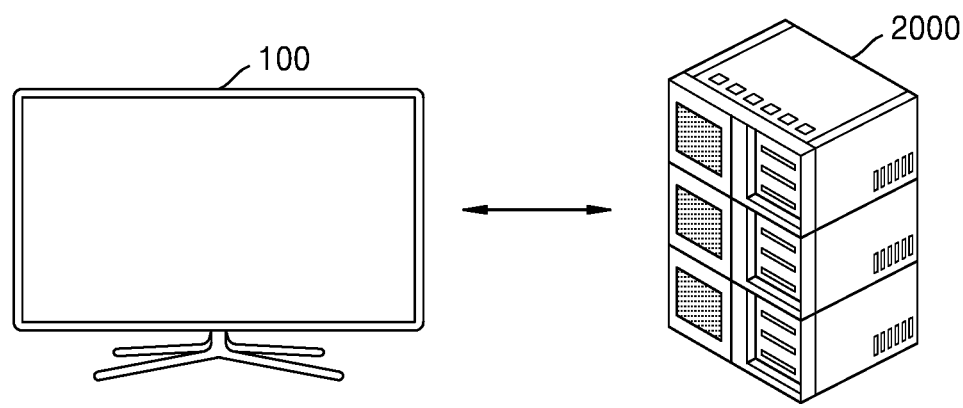
FIG. 14 is a diagram illustrating an example where a display apparatus and a server interoperate to generate multimedia content according to an embodiment.

FIG. 14 is a diagram illustrating an example where the display apparatus 100 and a server 2000 interoperate to generate multimedia content according to an embodiment.

Referring to FIG. 14, the server 2000 may train one or more of the first AI model, the second AI model, the third AI model and the fourth AI model according to an embodiment. Here, the server 2000 may perform a function of the data learner 1310 of FIG. 13.

The display apparatus 100 may receive the first through fourth AI models generated by the server 2000 from the server 2000, and may generate the multimedia content or the background music of the multimedia content by using the received first through fourth AI models. For example, based on at least one of the first through fourth AI models trained by the server 2000, the display apparatus 100 may generate the plot information of the multimedia content, based on the story information of the multimedia content and the emotion information of the multimedia content, may generate the sequence information of the multimedia content, based on the generated plot information of the multimedia content, and may generate the scene information of the multimedia content, based on the sequence information of the multimedia content. The display apparatus 100 may also generate the multimedia content, based on the scene information of the multimedia content, and generate the background music of the multimedia content.

The display apparatus 100 may transmit data to the server 2000, and may request the server 2000 to process the data by applying the data to the first through fourth AI models. For example, the server 2000 may generate the multimedia content or the background music of the multimedia content by using the first through fourth AI models. For example, when the display apparatus 100 transmits the story information of the multimedia content and the emotion information of the multimedia content to the server 2000, the server 2000 may generate the plot information of the multimedia content, based on the received story information of the multimedia content and the received emotion information of the multimedia content, may generate the sequence information of the multimedia content based on the generated plot information of the multimedia content, and may generate the scene information of the multimedia content based on the sequence information of the multimedia content. The server 2000 may also generate the multimedia content, based on the scene information of the multimedia content, and generate the background music of the multimedia content.

The server 2000 may transmit the generated multimedia content and the generated background music to the display apparatus 100, and the display apparatus 100 may output the received multimedia content and the received background music.

Figure 15:
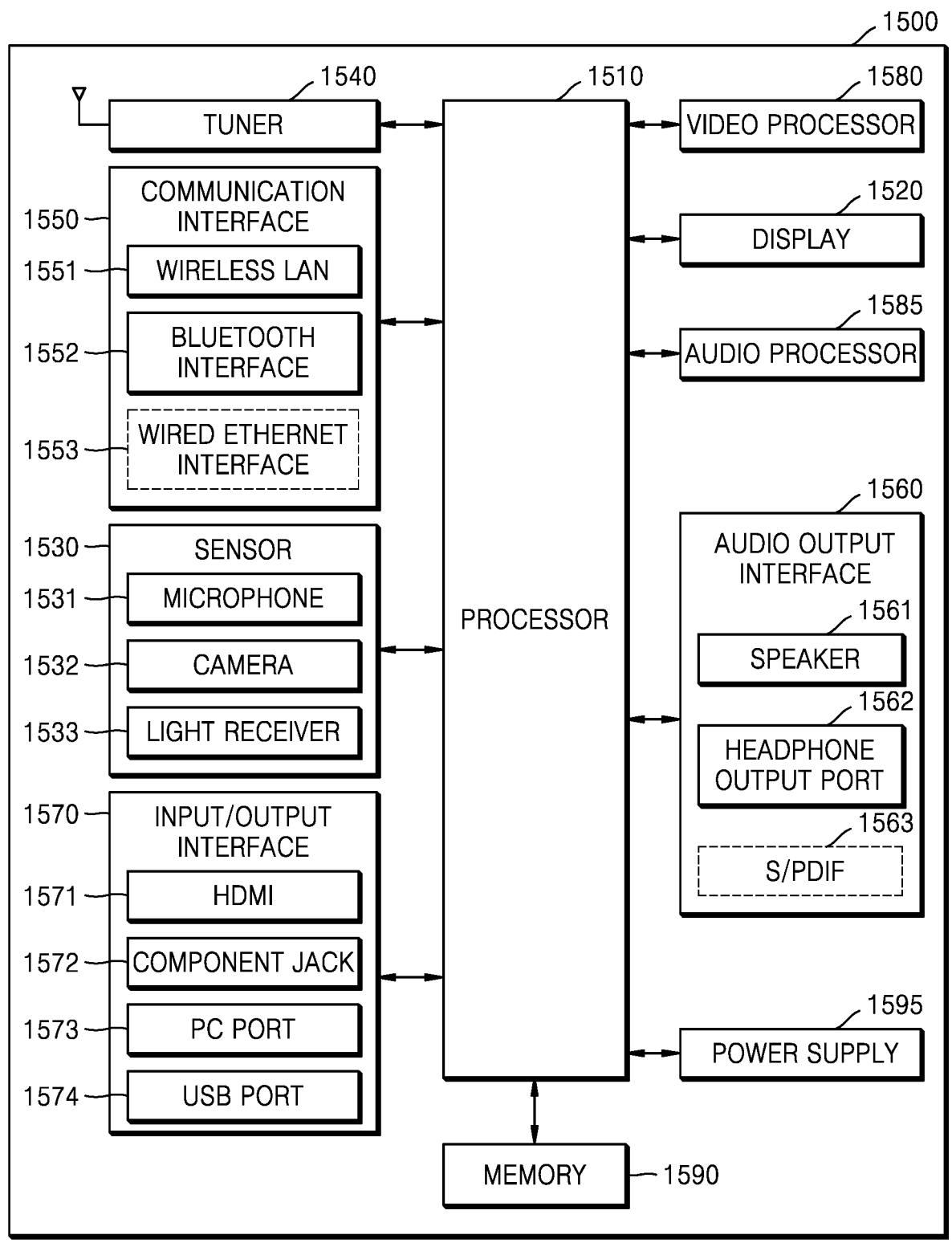
FIG. 15 is a block diagram of a display apparatus according to an embodiment.

FIG. 15 is a block diagram of a display apparatus 1500 according to an embodiment. The display apparatus 1500 of FIG. 15 may correspond to the display apparatus 100 of FIG. 12.

Referring to FIG. 15, the display apparatus 1500 may include a tuner 1540, a processor 1510, a display 1520, a communication interface 1550, a sensor 1530, an input/output (I/O) interface 1570, a video processor 1580, an audio processor 1585, a memory 1590, and a power supply 1595.

The tuner 1540 may tune and select a frequency of a channel that the display apparatus 1500 is configured to receive, from among a plurality of radio wave frequency that are obtained by, for example, amplifying, mixing, or resonating a wired or wireless broadcasting signal. The broadcasting signal includes audio, video, and additional information (for example, an electronic program guide (EPG)).

The tuner 1540 may receive a broadcasting signal in a frequency band corresponding to a channel number according to a user input (for example, a control signal received from a control device, for example, a channel number input, a channel up-down input, and a channel input on an EPG screen image).

The tuner 1540 may receive a broadcasting signal from various sources, such as terrestrial broadcasting, cable broadcasting, satellite broadcasting, and Internet broadcasting. The tuner 1540 may also receive a broadcasting signal from a source such as analog broadcasting or digital broadcasting.

The communication interface 1550 may transmit or receive data or a signal to or from an external apparatus or a server under the control of the processor 1510. The processor 1510 may transmit/receive content to/from the external apparatus via the communication interface 1550, for example, downloading an application from the external apparatus or web-browsing. The communication interface 1550 may transmit or receive data or a signal according to at least one method from among a wireless local area network (LAN) 1551 (e.g., Wi-Fi), a Bluetooth network 1552, or a wired Ethernet network 1553 according to the configuration of the display apparatus 1500.

The video processor 1580 processes video data received by the display apparatus 1500. The video processor 1580 may perform a variety of image processing, such as decoding, scaling, noise filtering, frame rate transformation, and resolution transformation, on the received video data.

The sensor 1530 may be configured to detect a voice of a user, an image of the user, or a movement of the user, and may include a microphone 1531, a camera 1532, and a light receiver 1533.

The microphone 1531 may receive an uttered voice of the user and/or surrounding noise. The microphone 1531 may transform the received voice into an electrical signal and output the electrical signal to the processor 1510. The user voice may include, for example, a voice corresponding to a menu or function of the display apparatus 1500.

The camera 1532 may be configured to capture or obtain an image or a video including consecutive image frames corresponding to a motion of the user including a gesture within a recognition range of the camera 1532. The processor 1510 may be configured to use a result of the recognition of the received motion based on the captured image, and perform control corresponding to the result of the motion recognition.

The light receiver 1533 may be configured to receive an optical signal (including a control signal) from an external control device via a light window or the like of the bezel of the display 1520. The light receiver 1533 may receive an optical signal corresponding to a user input (for example, touch, pressing, a touch gesture, a voice, or a motion) from the control device. A control signal may be extracted from the received optical signal under the control of the processor 1510.

The I/O interface 1570 receives video (for example, a moving picture), audio (for example, a voice or music), and additional information (for example, an EPG) from outside the display apparatus 1500 under the control of the processor 1510. The I/O interface 1570 may include a high-definition multimedia interface (HDMI) port 1771, a component jack 1572, a PC port 1573, or a USB port 1574. The I/O interface 1570 may include a combination of the HDMI port 1571, the component jack 1572, the PC port 1573, and the USB port 1574.

The processor 1510 controls an overall operation of the display apparatus 1500 and processes data between the internal components of the display apparatus 1500. When there is an input of a user or preset and stored conditions are satisfied, the processor 1510 may execute an OS and various applications that are stored in the memory 1590.

The processor 1510 may include random-access memory (RAM) that stores a signal or data input by an external source of the display apparatus 1500 or is used as a memory area for various operations performed by the display apparatus 1500, and read-only memory (ROM) that stores a control program for controlling the display apparatus 1500.

The GPU generates a screen image including various objects, such as an icon, an image, and text, by using an arithmetic unit and a rendering unit. The arithmetic unit calculates attribute values, such as a coordinate value, a shape, a size, a color, and the like, with which each object is to be displayed according to layouts of the screen image, based on the user input sensed by the sensor 1530. The rendering unit generates screen images of various layouts including objects, based on the attribute values calculated by the arithmetic unit. The screen images generated by the rendering unit are displayed on a display area of the display 1520.

The display 1520 generates a driving signal by converting an image signal, a data signal, an OSD signal, and a control signal that are processed by the controller 1510. The display 1520 may be a PDP, an LCD, an OLED display, a flexible display, or a 3D display. The display 1520 may be configured as a touchscreen, and thus, may serve as an input device as well as an output device.

The audio processor 1585 processes audio data. The audio processor 1585 may perform a variety of processing, such as decoding, amplification, or noise filtering, on the audio data. The audio processor 1585 may include a plurality of audio processing modules to process pieces of audio respectively corresponding to a plurality of pieces of content.

The audio output interface 1560 outputs audio included in the broadcasting signal received via the tuner 1540, under the control of the processor 1510. The audio output interface 1560 may also output audio (for example, a voice or a sound) that is input via the communication interface 1550 or the I/O interface 1570. The audio output interface 1560 may also output audio stored in the memory 1590 under the control of the processor 1510. The audio output interface 1560 may include at least one of a speaker 1561, a headphone output port 1562, or a Sony/Philips Digital Interface (S/PDIF) output port 1563. The audio output interface 1560 may include a combination of the speaker 1561, the headphone output port 1562, and the S/PDIF output port 1563.

The power supply 1595 supplies power that is input from an external power source, to the internal components of the display apparatus 1500, under the control of the processor 1510. The power supply 1595 may also supply power that is output by one or more batteries included in the display apparatus 1500, to the internal components of the display apparatus 1500, under the control of the processor 1510.

The memory 1590 may store various data, programs, or applications for driving and controlling the display apparatus 1500 under the control of the processor 1510. The memory 1590 may include a broadcasting receiving module, a channel control module, a volume control module, a communication control module, a voice recognition module, a motion recognition module, a light receiving module, a display control module, an audio control module, an external input control module, a power control module, a power control module of a wirelessly (for example, Bluetooth) connected external apparatus, a voice DB, or a motion DB. These modules and the DBs of the memory 1590 may be implemented as software in order to perform a broadcasting reception control function, a channel control function, a volume control function, a communication control function, a voice recognition function, a motion recognition function, a light receiving control function, a display control function, an audio control function, an external input control function, a power control function, or a power control function of the wirelessly (for example, Bluetooth) connected external apparatus in the display apparatus 1500. The processor 1510 may perform these functions by using the software stored in the memory 1590.

The block diagrams of the display apparatuses 100 and 1500 respectively shown in FIGS. 12 and 15 are only example embodiments of the disclosure. Components illustrated in FIGS. 12 and 15 may be combined or omitted according to various configurations of the display apparatuses 100 and 1500 when being actually implemented, or additional components may be included in the block diagrams of FIGS. 12 and 15. In other words, two or more components may be combined into a single component, or a single component may be divided into two or more components. A function performed in each block is merely an example to explain embodiments, and a detailed operation or device of each block does not limit the scope of the embodiments.

An operation method of a display apparatus according to an embodiment may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for embodiments or may be well-known to and be usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a RAM, or a flash memory. Examples of the program commands are advanced language codes that can be executed by a computer by using an interpreter or the like as well as machine language codes made by a compiler.

Also, display apparatuses or operation methods of the display apparatuses according to the disclosed embodiments may be provided in a computer program product. The computer program product may be traded as a commodity between a seller and a purchaser.

The computer program product may include a software program and a computer-readable storage medium having the software program stored thereon. For example, the computer program product may include a product in the form of a software program (e.g., a downloadable app) that is electronically distributed through the manufacturer of an electronic device or an electronic market (e.g., Google Play Store, AppStore). For electronic distribution, at least a portion of the software program may be stored on a storage medium or may be created temporarily. In this case, the storage medium may be a server of a manufacturer, a server of an electronic market, or a storage medium of a relay server for temporarily storing an SW program.

The computer program product may include, in a system including a server and a client device, a storage medium of the server or a storage medium of the client device. Alternatively, if there is a third device (e.g., a smartphone) in communication with the server or client device, the computer program product may include a storage medium of the third device. Alternatively, the computer program product may include the S/W program itself transmitted from the server to the client device or the third device, or transmitted from the third device to the client device.

For example, one of the server, the client device, and the third device may execute the computer program product to perform the methods according to the one or more embodiments. Alternatively, at least two of the server, the client device, and the third device may execute the computer program product to distribute and perform the methods according to the disclosed embodiments.

For example, a server (e.g., a cloud server or an artificial intelligence server) may execute a computer program product stored on a server to control a client device communicating with the server to perform the methods according to the disclosed embodiments.

Because a display apparatus according to an embodiment of the disclosure is capable of generating multimedia content by using an AI model by inputting only genre information of the multimedia content and emotion information, a user does not need to write scene information (or script information) of the multimedia content.

Because the display apparatus according to an embodiment is capable of generating the scene information of the multimedia content based on plot information of the multimedia content, and the multimedia content based on the scene information by using the AI model, the user may generate the multimedia content by writing only the plot information of the multimedia content, without needing to write or obtain the scene information (script information) of the multimedia content.

Therefore, the user of the display apparatus may easily generate and watch user various pieces of multimedia content by using the display apparatus.

While one or more embodiments of the disclosure have been described with reference to the accompanying drawings, it will be understood by those of ordinary skill in the art that various changes in form and details may be made therein without departing from the spirit and scope as defined by the following claims.

What is claimed is:

1. A display apparatus for generating multimedia content, the display apparatus comprising:
   a display;
   a memory storing one or more instructions; and
   a processor configured to execute the one or more instructions stored in the memory,
   wherein the processor is configured to:
      obtain genre information and emotion information of the multimedia content;

generate plot information of the multimedia content based on the genre information and emotion information of the multimedia content by using a first artificial intelligence (AI) model;
generate sequence information based on one or more sequences of the multimedia content corresponding to the plot information by using a second (AI) model;
generate scene information based on the sequence information by using a third AI model;
generate the multimedia content based on the scene information; and
control the display to output the multimedia content.

2. The display apparatus of claim 1, wherein the emotion information of the multimedia content comprises valence information represented with respect to a reproduction time of the multimedia content and arousal information represented with respect to the reproduction time of the multimedia content.

3. The display apparatus of claim 1, wherein the processor is further configured to randomly obtain story information of the multimedia content from a story database (DB), and
wherein the first AI model is trained to output the plot information based on the story information, the genre information and the emotion information.

4. The display apparatus of claim 1, wherein the second AI model is trained to output the sequence information based on the plot information.

5. The display apparatus of claim 1, wherein the third AI model is trained to output the scene information based on receiving character information of the multimedia content and the sequence information of the multimedia content.

6. The display apparatus of claim 1, wherein the scene information comprises at least one of background information of a scene, information about a behavior of a character appearing in the scene, and conversation contents of the character.

7. The display apparatus of claim 6, wherein the processor is further configured to:
select a character from a character database (DB), based on the character information of the multimedia content; and
generate the multimedia content based on the selected character and the scene information.

8. The display apparatus of claim 1, wherein the processor is further configured to generate the background audio corresponding to the emotion information and the genre information of the multimedia content by using a fourth AI model, and
wherein the fourth AI model is trained to output the background audio based on the emotion information and the genre information of the multimedia content.

9. The display apparatus of claim 1, further comprising: an audio output interface;
wherein the processor is further configured to:
obtain genre information and emotion information of the multimedia content, and generate the plot information of the multimedia content based on the genre information and the emotion information of the multimedia content by using the first AI model,
obtain emotion information about the scene, based on the scene information, and generate a background audio of the scene, based on the genre information of the multimedia content and the emotion information, and
control the audio output interface to output the background audio.

10. The display apparatus of claim 9,
wherein the processor is further configured to generate the background audio corresponding to the emotion information and the genre information of the multimedia content by using a fourth AI model,
wherein the fourth AI model is trained to output the background audio based on the emotion information and the genre information of the multimedia content.

11. The display apparatus of claim 10, wherein the processor is further configured to implement a data learner, wherein the data learner is configured to:
train the first AI model by using learning data including sample story information of the multimedia content, sample emotion information of the multimedia content, and sample plot information of the multimedia content by iteratively feeding into an initial first AI model until the initial first AI model satisfies a predetermined condition
train the second AI model by using learning data including sample plot information of the multimedia content and sample sequence information of the multimedia content;
train the third AI model by using learning data including sample character information of the multimedia content, sample sequence information of the multimedia content, and sample scene information of the multimedia content,
train the fourth AI model by using learning data including sample emotion information of a scene and sample genre information of the multimedia content, and
store the first AI model, the second AI model, the third AI model and the fourth AI model in the memory of the display apparatus.

12. An operation method of a display apparatus for generating multimedia content, the operation method comprising:
obtaining genre information and emotion information of the multimedia content;
generating plot information of the multimedia content based on the genre information and emotion information of the multimedia content by using a first artificial intelligence (AI) model;
generating sequence information including one or more sequences of the multimedia content corresponding to the plot information by using a second AI model;
generating scene information based on the sequence information by using a third AI model;
generating the multimedia content based on the scene information; and
outputting the multimedia content.

13. The operation method of claim 12, wherein the emotion information of the multimedia content comprises valence information represented with respect to a reproduction time of the multimedia content and arousal information represented with respect to the reproduction time of the multimedia content.

14. The operation method of claim 12, wherein the obtaining of the plot information of the multimedia content further comprises randomly obtaining story information of the multimedia content from a story database (DB), and
wherein the first AI model is trained to output the plot information based on the story information, the genre information, and the emotion information.

15. The operation method of claim 12, wherein the second AI model is trained to output the sequence information based on the plot information.

16. The operation method of claim 12, wherein the third AI model is trained to output the scene information based on receiving character information of the multimedia content and the sequence information of the multimedia content.

17. The operation method of claim 12, wherein the scene information comprises at least one of background information of a scene, information about a behavior of a character appearing in the scene, and conversation contents of the character.

18. The operation method of claim 17, wherein the generating of the multimedia content comprises:
    selecting a character from a character database (DB), based on the character information of the multimedia content; and
    generating the multimedia content based on the selected character and the scene information.

19. A non-transitory computer-readable recording medium having recorded thereon a computer program, which, when executed by a computer, performs the method of claim 12.

\* \* \* \* \*